United States Patent

[11] 3,628,819

| [72] | Inventor | Wanda L. Fowler<br>910 N. Oaks Ave., Ontario, Calif. 91762 |
|---|---|---|
| [21] | Appl. No. | 25,187 |
| [22] | Filed | Apr. 2, 1970 |
| [45] | Patented | Dec. 21, 1971 |

[54] CULINARY UTENSIL
2 Claims, 3 Drawing Figs.

| [52] | U.S. Cl. | 294/50 |
|---|---|---|
| [51] | Int. Cl. | A01d 9/06 |
| [50] | Field of Search | 294/50 |

[56] References Cited
UNITED STATES PATENTS

| 585,393 | 6/1897 | Matthews | 294/50 |
|---|---|---|---|
| 1,189,692 | 7/1916 | Hoffman | 294/50 |

Primary Examiner—Richard E. Aegerter
Assistant Examiner—I. Kenneth Silverman

ABSTRACT: An ejector-type culinary utensil has a plurality of tines and an ejector bar slidable on said tines. A lever arrangement connected to the ejector bar has an ejector tab adjacent the main handle, whereby the user may operate the tab to automatically eject a food product from the tines.

PATENTED DEC 21 1971　　　　　　　　　　　　　　　3,628,819

INVENTOR.
WANDA L. FOWLER

CULINARY UTENSIL

This invention relates to an improved kitchen fork having means whereby a food product may be ejected from the tines of of the fork.

Numerous features and advantages of the invention will be apparent as it is better understood from the following description, which, taken in connection with the accompanying drawings, discloses a preferred embodiment thereof.

Figure 1:
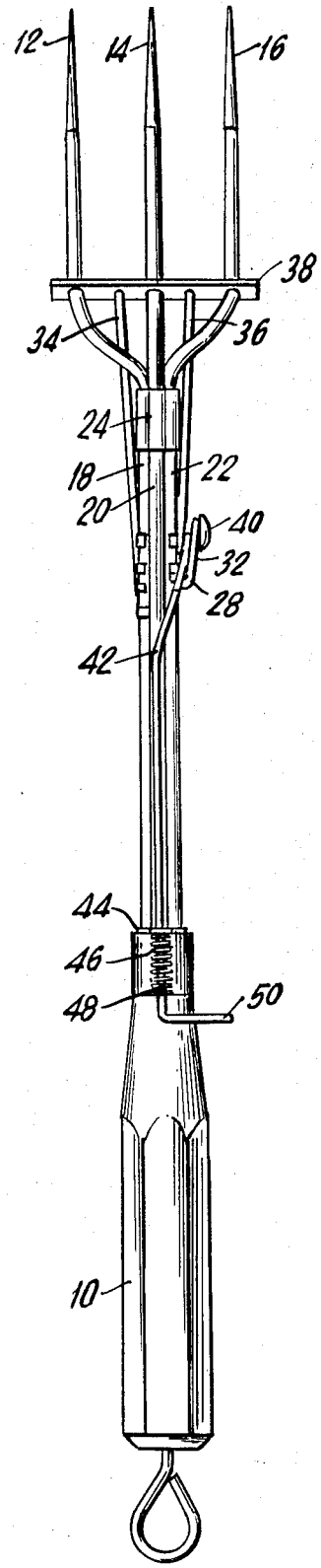
FIG. 1 is a plan view of the culinary utensil ejector device according to one embodiment of the invention.

Referring to the drawings, the device comprises a handle 10 having three tines 12, 14, 16 at the end of three shanks 18, 20, 22 respectively. Each of the shanks 18, 20, 22 are suitably secured to the handle 10. A collar 24 may be provided to secure the three shanks 18, 20, 22 together adjacent the tines 12, 14, 16.

Suitably secured to the shanks 18, 20, 22 is a clip member 25 which pivotally supports a lever 26 along an intermediate section 28 of the latter which extends generally perpendicularly to the shanks 18, 20, 22. The lever 26 has two other sections 30 and 32 each perpendicular to the intermediate section 28. The section 30 has a hooked end 33 which is secured to the juncture of a V-shaped member having two legs 34, 36. The ends of the legs 34, 36 are secured to an ejector bar 38 which has three holes in which the tines 12, 14, 16 slidably fit. The tines are generally parallel so that the bar 38 will slide on the tines between the FIG. 2 and FIG. 3 position.

The section 32 of lever 26 has a pin 40 mounted on its end. The pin 40 forms a pivotal connection between section 32 and a rod 42 which extends to the handle 10 where it is slidably supported by a clip 44 secured to the handle 10. A coil spring 46 having one end secured to the clip 44 and the other end secured to rod 42 by the fastener 48 tends to maintain the rod 42 in the FIG. 1 position. The rod 42 has a handle portion in the form of a tab 50.

Figure 2:
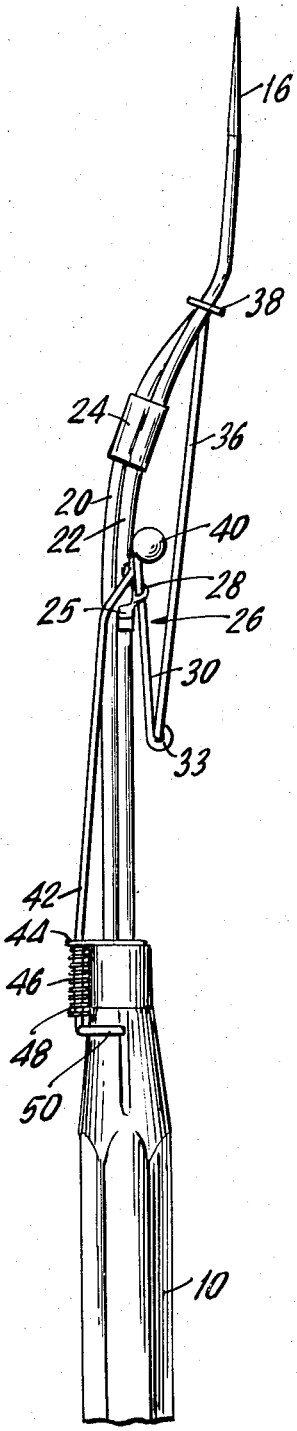
FIG. 2 is an elevational view of the device in FIG. 1 with a portion of the handle broken away.
Figure 3:
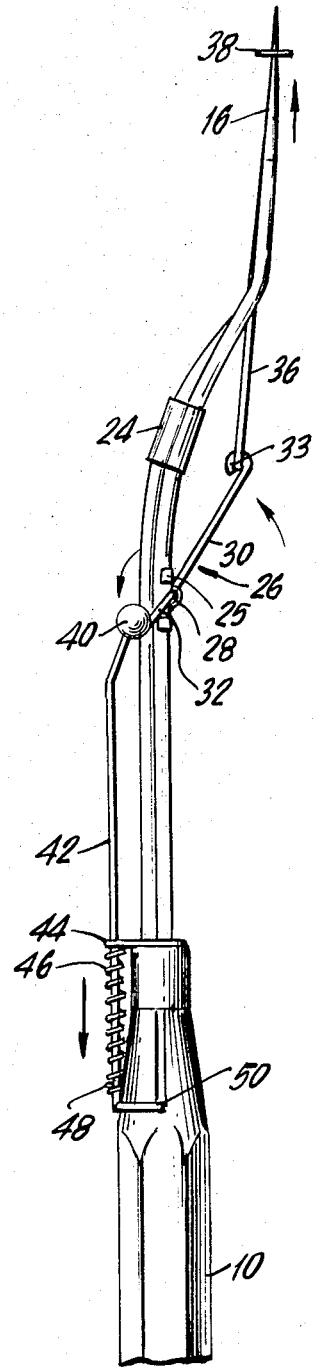
FIG. 3 is an elevational view similar to FIG. 2, but showing the utensil in operable position.

In use, the parts are in the position shown in FIGS. 1 and 2 wherein the tines 12, 14, 16 are adapted to be embedded in a food product or the like. When it is desired to eject the food product, the user merely uses one or more fingers to engage the ejector tab 50 and pull it rearwardly from the FIG. 2 to the FIG. 3 position. In so doing, the rod 42 will be pulled rearwardly, pivoting lever 26 and pushing ejector bar 38 along the tines to the FIG. 3 position to eject the food product from the tines. After the food product is ejected and the user releases the ejector tab 50, the latter along with the ejector bar 38 will return to their FIG. 1 position by the bias of spring 46 ready to be used again.

It is thought that this invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred embodiment thereof.

What is claimed is:

1. A culinary utensil comprising: a handle; a plurality of tines, shank means connecting said handle to said tines, collar means around said shanks adjacent said tines, pivot support means on said shank means; a pivoting lever pivotally supported along an intermediate section thereof extending generally perpendicular to said shank means; said lever having two further sections generally perpendicular to said intermediate section, one of said further sections having a hooked end; an actuating rod pivotally connected to the other section of said lever; means, biasing said rod toward said tines; a V-shaped member having two legs, an ejector bar slidably mounted on said tines said legs being secured at their extremities substantially in the middle of said ejector bar; said actuating rod having a right angle portion defining an ejector tab adjacent said handle whereby, upon pulling said tab, said means biasing said rod are rendered inoperative thereby causing said pivoting lever to pivot and push said V-shaped member ejector bar toward the extremities of said tines to eject food therefrom.

2. A culinary utensil according to claim 1, having a central tine, said legs of said V-shaped member being secured to said ejector bar at points lying on both sides of said central tine.

* * * * *